United States Patent [19]

Mosser et al.

[11] Patent Number: 6,150,033
[45] Date of Patent: Nov. 21, 2000

[54] ENVIRONMENTALLY FRIENDLY COATING COMPOSITIONS, BONDING SOLUTION, AND COATED PARTS

[75] Inventors: Mark F. Mosser, Perkiomenville; Kevin B. Eddinger, Gilbertsville, both of Pa.

[73] Assignee: Sermatech International, Inc., Limerick, Pa.

[21] Appl. No.: 09/148,603

[22] Filed: Sep. 4, 1998

Related U.S. Application Data

[62] Division of application No. 08/467,738, Jun. 6, 1995, Pat. No. 5,803,990.

[51] Int. Cl.⁷ ..................................................... B32B 17/00
[52] U.S. Cl. ...................... 428/469; 428/472.1; 106/690; 106/691
[58] Field of Search .................................. 148/261, 262; 106/690, 691; 428/469, 472.1

[56] References Cited

U.S. PATENT DOCUMENTS

| | | |
|---|---|---|
| 3,248,251 | 4/1966 | Allen . |
| 3,996,073 | 12/1976 | Evans . |
| 4,347,085 | 8/1982 | Haselkorn et al. . |
| 4,537,632 | 8/1985 | Mosser et al. . |
| 4,544,408 | 10/1985 | Mosser et al. . |
| 4,548,646 | 10/1985 | Mosser et al. . |
| 4,617,056 | 10/1986 | Mosser et al. . |
| 4,659,613 | 4/1987 | Mosser et al. . |
| 4,863,516 | 9/1989 | Mosser et al. . |
| 4,889,558 | 12/1989 | Mosser et al. . |
| 5,116,672 | 5/1992 | Mosser et al. . |
| 5,242,488 | 9/1993 | Stetson et al. . |
| 5,279,649 | 1/1994 | Stetson et al. . |
| 5,279,650 | 1/1994 | Stetson et al. . |
| 5,803,990 | 9/1998 | Mosser ................................. 148/261 |

FOREIGN PATENT DOCUMENTS

| | | |
|---|---|---|
| 0 062 513 | 10/1982 | European Pat. Off. . |
| 2 148 485 | 3/1973 | France . |
| 2 369 352 | 5/1978 | France . |

OTHER PUBLICATIONS

111:82287w, 6001 Chemical Abstracts, 111 (1989) (No Month).

115:13201j: 6001 Chemical Abstracts, 115 (1991) (No Month).

*Primary Examiner*—Timothy M. Speer
*Attorney, Agent, or Firm*—Schnader Harrison Segal & Lewis LLP

[57] ABSTRACT

An aqueous phosphoric bonding solution and coating composition slurry which are environmentally friendly in that they are generally free of molybdate or chromium. Yet the solution is stable with respect to inorganic metal particles, especially aluminum which are admixed to the bonding solution for the preparation of the coating slurry. The metal coated parts and the method of coating the parts with the coating composition are also described. The parts have very satisfactory properties.

16 Claims, No Drawings

ENVIRONMENTALLY FRIENDLY COATING COMPOSITIONS, BONDING SOLUTION, AND COATED PARTS

This is a continuation of pending application Ser. No. 08/364,786, filed Dec. 27, 1994. This application is a divisional of Ser. No. 08/467,738, filed Jun. 6, 1995, now U.S. Pat. No. 5,803,990.

BACKGROUND OF THE INVENTION

1. Field of the Invention

The present invention relates compositions and methods for providing corrosion protection to metal substrates, with bonding solutions and coating compositions for ferrous metal alloy surfaces which are free or at least substantially free of carcinogenic or toxic metals like chromate and molybdate, and to coating compositions comprising such bonding solutions and aluminum or like pigments.

2. Background Art

Compositions comprising phosphoric acid and aluminum metal are well known for use in protecting metallic surfaces such as ferrous surfaces from corrosion. In such coating compositions, particulate metallic aluminum, such as flake and/or powder, is combined with a phosphoric acid bonding solution to form a coating composition which is then applied to the metallic surface being treated. After application of the coating to the substrate, it may be heated to a first temperature, generally upwards of 500° F. (260° C.), until the coating is rendered essentially water insoluble. Then the coated surface may be cured at a second temperature, generally above 1000° F. (538° C.) to form the final protective coating.

A problem which arises in this coating process, is that when the particulate aluminum is combined with the phosphoric acid bonding solution, the acidic bonding solution can react with the aluminum. Such reactions can be very violent, causing the aluminum powder to burn or even explode, or less violent, simply resulting in the conversion of the metallic aluminum into various salts. In either case, such reactions interfere with the formation of suitable protective coatings.

Allen, U.S. Pat. No. 3,248,251, issued Apr. 26, 1966, describes coating compositions consisting essentially of a slurry of solid inorganic particulate material (such as aluminum) in an aqueous acidic bonding solution containing dissolved metal chromate, dichromate or molybdate, and phosphate. It was found that the addition of chromates or molybdates to the acidic bonding solution effectively passivated the solution toward aluminum and inhibited the oxidation of metallic aluminum, allowing particulate aluminum to be combined with the bonding solution without the undesirable chemical reaction between the acidic solution and the aluminum. These "Allen" coatings have been and still are successfully used to provide high quality coatings which protect ferrous metal alloy surfaces from oxidation and corrosion, particularly at high temperatures.

However, while chromates and molybdates have been used successfully to reduce the reactivity of the aluminum in such coating compositions, the use of chromates and molybdates has become a problem because of environmental considerations. Chromates and molybdates are generally considered to be toxic substances. Hexavalent chromium is rated as a carcinogen. Molybdenum is classified as a toxic heavy metal. It is therefore desirable to avoid the use of solutions of such salts, or at least to reduce their use. For this reason, it has become desirable to develop a phosphate/aluminum coating composition which requires little or no chromates or molybdates to control the reactivity between the acidic phosphate bonding solution and the particulate aluminum added thereto. The coating compositions should protect ferrous metal alloy surfaces from the oxidation and corrosive environmental conditions, especially at high temperatures, approximately as well as and preferably better than the so called Allen type coatings.

Recently efforts have been made to overcome the environmental problem associated with chromates and molybdates. Stetson et al., U.S. Pat. No. 5,242,488, issued Sep. 7, 1993 describes a coating composition for ferrous alloys which does not require either chromates or molybdates to control the reaction between the bonding solution and the powdered aluminum. The composition consists essentially of a slurry mixture of a bonding solution and aluminum powder. The bonding solution consists essentially of water, phosphoric acid ($H_3PO_4$), and aluminum in an amount sufficient to substantially equilibrate the bonding solution with respect to aluminum. The bonding solution component of the coating composition of this Stetson patent requires that it contains sufficient aluminum in solution so that it is substantially equilibrated with respect to aluminum, i.e., that the amount of aluminum in solution be substantially at the saturation point and therefore, essentially inert with respect to any subsequent additions of aluminum.

The Stetson patent teaches magnesium, while not essential, may desirably be used to at least partially neutralize the aqueous phosphoric acid mixture, either before or after equilibration of the mixture with aluminum. The magnesium compound is either MgO or $MgCO_3$. All examples given in the patent utilize magnesium ions.

An even more recent patent to Stetson, et al., U.S. Pat. No. 5,279,649, issued Jan. 18, 1994, discloses substantially the same compositions to which $V_2O_5$ has been added to produce vanadate ion, adding another inhibitor to the aluminum equilibrated mixture. Further, in U.S. Pat. No. 5,279,650, also issued on Jan. 18, 1994, Stetson, et al. discloses a seal coating composition of the coating disclosed in the '649 companion patent which also contains ion oxide ($Fe_2O_3$) powder. All these three coating compositions are designed to avoid the use of the chromium and molybdenum ions and require the bonding solution to be equilibrated with respect to further additions of aluminum as described in these patents. The addition of $V_2O_5$ demonstrates the addition of a toxic substance, listed on the OSHA extremely hazardous substance list.

Although Stetson indicates that this formulation controls the reactivity between the bonding solution and the aluminum, it has been discovered in work in connection with this invention that some reaction still occurs between the bonding solution and the powdered aluminum when the slurry composition of Stetson is formulated.

It is therefore desirable to formulate a chromium and molybdenum free bonding solution, or one which is of reduced chromium and molybdenum content, which has reduced reactivity with particulate aluminum when the two are combined to form a coating composition and also to be free of toxic additives. This invention contributes to this objective.

SUMMARY OF THE INVENTION

In accordance with the present invention there is provided an improved bonding solution for use in forming a ferrous alloy coating composition comprising the bonding solution and particulate metal particles like aluminum.

The present invention is also directed to a coating composition comprising the bonding solution of the present invention and particulate metal particles like aluminum. The particulate aluminum may be of any suitable form, including powder or flake, or a combination of powder and flake.

The present invention also provided a method of protecting an alloy substrate by applying the present coating composition, and then heating the coated substrate to cure the coating composition and form a corrosion protected surface.

The invention also provides coated metal parts coated with the cured coating compositions of the invention.

The bonding solution of the present invention comprises an aqueous solution of phosphoric acid and a combination of at least one cation and one anion other than chromium and/or molybdenum to reduce the reactivity of the bonding solution to the particulate aluminum with which it may be subsequently combined to form a coating composition. Preferably, the ions are zinc and borate. The bonding solution may optionally contain aluminum in solution. The amount of aluminum in solution is in an amount less than necessary to reach the saturation point, thus, less the than the amount necessary to equilibrate the bonding solution with respect to additional aluminum. In other words, the amount of aluminum is less than that which Stetson teaches is necessary to equilibrate the bonding solution so that it will be essentially inert when powdered aluminum is subsequently admixed to the bonding solution to form the coating slurry. Although the bonding solution of the invention is not in equilibrium or saturated, as in the prior art, the bonding solution is stable, i.e., non-reactive with respect to particulate aluminum.

The bonding and coating compositions of the invention are preferably free or substantially free of chromium, especially hexavalent chromium and molybdate and other toxic metals, like nickel or vanadium. If they contain one or more of such metals, these may be present in amounts less than present in the prior art, like in the above-identified Allen patent. The composition of the invention, though free or substantially free of such objectionable metals, are stable for periods of time adequate to apply the coating, especially for periods exceeding 1 hour, preferably more than 4 or more than 8 hours. Others are stable for several days and remain liquid for many weeks. The coatings are very satisfactory, in general come up to the standards of the Allen coatings in terms of resistance to oxidation and corrosion especially at high temperature. The coatings of the invention are especially well suited for turbine compressor airfoils, like blades, vanes, stators, etc.

Although one or more individual components of the bonding solution may have low or reduced solubility or miscibility in water or in the aqueous phosphoric acid, ideally the bonding composition as a whole should be an aqueous solution. It is recognized, however, that some of the less soluble or miscible components may be present in emulsion or other non-solution form. Thus, in accordance with the invention, the term "aqueous bonding solution" or "bonding solution" is intended to include a composition in which one or more of its components may not be fully dissolved, but may be emulsified or dispersed or in other form. This statement is intended to apply to component(s) here described and others not described.

For best bonding results, the bonding solution should have a pH in the range of about 2.0 to about 4.5, preferably about 2.5 to about 3.0, and more preferably about 2.7 to about 3.0. To obtain the desired pH, additional amounts of acid or base may be added to the composition. To lower the pH by the addition of acid, a water-soluble phosphoric acid or acid salt such as magnesium dehydrogen phosphate may be used.

The coating composition of the invention comprises the bonding solution and a solid particulate metallic material, generally aluminum powder. Instead of or in addition to aluminum, there may be used other metal particles, as disclosed in the above referenced Allen patent and in the patents referenced herein below which discuss aluminum or other metal particles, which are incorporated herein by reference. The coating composition may contain additional metals in solution, like pigments there may be another or additional source of borate and/or zinc, like zinc molybdate phosphate, zinc aluminum phosphate, zinc phosphate and other partially soluble (leachable) compounds, so called corrosion inhibitors. The coating composition can contain any other components conventionally in the coating industry. The coated ferrous parts exhibit very satisfactory properties equivalent or better than those shown by the Allen and Stetson patents.

DESCRIPTION OF THE PREFERRED EMBODIMENTS

In accordance with the present invention, there is provided an improved bonding solution for use in preparing a coating composition comprising the bonding solution and particulate metal particles like aluminum.

The bonding solution is an aqueous solution which contains phosphoric acid, one or more sources of magnesium ions and a source of zinc and of borate ions. Another aqueous bonding solution of phosphoric acid comprises one or more sources magnesium ions and a source of aluminum ions to be dissolved in the phosphoric acid solution. Another bonding solution contains, in addition to a source of magnesium ions, a source of aluminum ions and a source of either one or both zinc and borate ions.

The bonding solution is preferably adjusted to a pH in the range of 2 to 4.5.

The amount of aluminum ions in solution is such that it is in an amount insufficient to substantially equilibrate the bonding solution with respect to metal particles like aluminum, which are added in formulating the slurry of the coating composition. The aluminum ions dissolved in the bonding solution is thus an amount less than that which form undissolved aluminum in the container. Such an amount of unreacted or precipitated aluminum or aluminum compound would indicate that the reaction between the aluminum ions and the phosphoric acid has gone to completion and equilibrium had been reached. As discussed above, when aluminum ions are present in the bonding solution of the invention, it is in an amount insufficient to neutralize the bonding solution with respect to aluminum particles.

The bonding solution of the invention is stable, that is unreactive or substantially unreactive (or inert) to aluminum particles added subsequently. In accordance with a reactivity test described below, the coating composition of the invention will show no or essentially no visible reaction when aluminum particles are admixed to the bonding solution for at least up to one hour, preferably for up to 4 hours, more preferably up to 8 hours and ideally for more than 8 hours.

The magnesium ions in the bonding solution may be supplied by way of any convenient source like in the form of magnesium carbonate, magnesium oxide or hydroxide, etc. which will dissolve in the phosphoric acid forming the metal ions, water and/or gas which is evolved. The magnesium can be added magnesium. It is convenient to add magnesium oxide and/or magnesium carbonate. The amount added alone or in combination with the other compounds will be sufficient to bring the pH within the desired range of 2 to 4.5 or somewhat below or above so that upon addition of the other compounds, e.g., the zinc and/or the borate, the pH will be within that range.

Other suitable magnesium compounds which can serve as a suitable source of magnesium ions are listed in the Handbook of Chemistry and Physics ("Handbook"), 62nd Ed. CRC Press, Inc. Boca Raton, Fla., Editor Weast and Astle in the Chapter on Physical Constants of Inorganic Compounds, which is incorporated herein by reference.

The zinc ions in the bonding solution may likewise be supplied by way of any convenient source like in the form of the metal oxide, hydroxide, carbonate, zinc phosphate, zinc moly/phosphate etc. A suitable form is by way of a salt such as the zinc carbonate or zinc phosphate. Likewise, the zinc orthophosphate may be used. Other appropriate zinc compounds are listed in the above-cited Handbook.

The borate ion in the bonding solution may be supplied by way of any convenient source in the form of any soluble borate salts. A preferred form is to supply the borate as boric acid and/or zinc borate. Other appropriate borate compounds are listed in the Handbook.

The borate, the zinc and the magnesium ions are preferably supplied in a form that is soluble in the phosphoric acid.

The amount of the zinc and/or borate ions to be provided in the bonding solution should be such as to maintain or bring the pH range in that specified of 2 to 4.5.

The order of mixing or addition of the solid components of the bonding solution is not critical. It is preferred though, that the source of the magnesium ion be added first followed by either the source of the zinc and/or borate ions, or the aluminum ions.

In accordance with the invention, the coating slurry composition of the invention is formed by mixing the above described bonding solution with the metal particles, preferably the aluminum particles in the form of a powder. It is noteworthy that the bonding solution is essentially inert with respect to any further reaction with the added aluminum. No visible reaction between the added aluminum particles and the phosphoric acid is apparent in the coating composition of the invention for at least one hour and the best compositions for a period as long as eight hours.

The bonding solutions of the present invention are particularly useful for forming coating compositions for ferrous metal alloy substrates when combined with particulate aluminum. Particulate aluminums suitable for use in such coating compositions are well known, and have been discussed at length in the patent literature. For example, such particulate aluminums are set forth in Mosser, U.S. Pat. No. 4,537,632, Mosser et al., U.S. Pat. No. 4,544,408, Mosser et al., U.S. Pat. No. 4,548,646, Mosser et al., U.S. Pat. No. 4,617,056, Mosser et al., U.S. Pat. No. 4,659,613, Mosser et al., U.S. Pat. No. 4,863,516, which is particularly directed to the use of non-leafing aluminum flake in combination with atomized aluminum particles, Mosser, U.S. Pat. No. 4,889,558, Mosser, U.S. Pat. No. 4,537,632 and Mosser et al., U.S. Pat. No. 5,116,672, all of which are incorporated herein by reference. A majority of chromate/phosphate based compositions that utilize aluminum particles use atomized and/or flaked particles of various sizes for coatings with different properties. These are of course also suitable for the present bonding and coating compositions.

When aluminum is used in the compositions of the invention it may be gas atomized spherical of an average size of 2.5–10 $\mu$m $\overline{ESD}$, air atomized of an average size of 4.5–10 $\mu$m $\overline{ESD}$, flake aluminum; flake/atomized mixtures; and aluminum alloys. Larger particles as well as smaller particles can be used.

The coating compositions of the present invention may also include one or more leachable corrosion inhibitors. Such corrosion inhibitors are discussed at length in Mosser et al., U.S. Pat. No. 5,116,672, incorporated herein by reference. The leachable pigment is one which is capable of inhibiting or passivating the corrosion of the metal substrate. The leachable pigment is preferably a salt containing environmentally acceptable metals like, molybdate, phosphate or metaborate and combinations, as well as others listed in the publication by Smith entitled "Inorganic Primer Pigments", Federation Series on Coatings Technology, which is incorporated herein by reference. Good leachable corrosion inhibitors for use in the coating compositions of the present invention are zinc molybdate/phosphate, zinc phosphate and barium, calcium, zinc borate and zinc aluminum phosphate.

For purposes of the present coating compositions, it is preferable to avoid the use of chromate salts as the leachable pigment, due to environmental considerations. However, such chromate salts may be used as the leachable pigment in applications where such use can be tolerated.

The compositions of the invention may, of course, contain other compatible known ingredients such as surfactants, wetting agents-and other conventional additives.

The slurry coating compositions of the invention are applied in a conventional way to the ferrous metal alloy surface to be coated. Manners of application are described in the patents referred to above and incorporated herein by reference. Generally, it is desirable to degrease the part to be coated, abrade, roughen and blast with abrasive, apply the coating of the invention by any suitable means, such as by spraying, brushing, dipping, dip spinning, etc., drying until the color of the coating turns grayish, curing the coating at a temperature of about 650° F. (343° C.) for 15 minutes or longer, curing at higher or lower temperatures if desired. The slurry is preferably applied in two coats, each about 0.00125 inch (0.032 $\mu$m) in thickness, then, if desired, dried at about 180° F. (82° C.) for 15 to 30 minutes and then cured at 650° F. (340° C.) for 30 to 60 minutes between each coat. Drying is not an essential step.

The coatings as cured at 650° F. (343° C.) are not electrically conductive and therefore can not provide galvanic protection against corrosion of the underlying substrate material. However, the coating may be made electrically conductive by bead peening or burnishing with glass beads, abrasive media at low pressure or mechanically cold worked in other ways to produce a conductive sacrificial coating or by heating as specified in MIL-C-81751B specification (incorporated herein by reference). In this manner the coatings can, by mechanical or thermal processes, be made electrically conductive and thereby produce galvanic as well as barrier protection of the underlying ferrous alloy substrate. Desirably, after the second coating is applied, dried, cured and processed to make it electrically conductive, the surface of the coating is sealed with the bonding solution to further increase the oxidation and corrosion protection provided by the coating, and to decrease the rate of consumption of aluminum in the coating during service. The bonding solution can but need not be a bonding solution of the invention. The seal coats are dried and cured at the same time and temperature as the above described slurry coatings.

As have been described above, it is an important object of the invention to provide bonding and coating compositions which are essentially free of chromate, molybdate and other like toxic or undesirable metals. In situations where more permissive environmental conditions would permit the use of such metals as chromium, molybdenum, nickel and others, it is not excluded that such metals be used in the bonding and/or the coating composition. When it is chromium and/or molybdenum, it would be in an amount of chromium and/or molybdenum which is less than that necessary to passivate or neutralize the phosphoric acid solution to the reaction with metallic aluminum. The amount necessary to passivate the bonding solution as taught in the prior art generally is at least 0.2% by weight of the final coating composition. But by far preferable as disclosed herein are the compositions which are essentially free, if not virtually or totally free, of chromate and/or molybdate ions.

The following Examples are merely illustrative of the invention. They are not intended as being limiting.

EXAMPLE 1

Bonding Solutions

Test bonding solutions were prepared starting with the following base formula:

2300 g Deionized water
1326 g Phosphoric acid, 85%
150 g Magnesium oxide
155 g Magnesium carbonate
75 g Aluminum hydroxide The pH of the bonding solution was 2.0. To the above base formula additional components were added to form test solutions. Each test solution was tested for stability when combined with aluminum powder.

The screening test employed to evaluate the reactivity of a bonding solution with aluminum metal powder proceeds as follows. Aluminum powder (10–40 grams) were added to 50 Ml of a candidate bonding solution and the time to noticeable reactivity was measured as well as the violence of the reaction.

A 100 ml of the above base solution was mixed in the compounds shown in Table 1 below and then mixed with 80 grams of 5 $\mu$m aluminum powder and allowed to react. The time until visible reaction was measured (in hours). The test results are presented in Table I:

TABLE I

| Test # | Description (changes to 100 mL of) (Bonding Composition #1) | pH | Hours to Reaction | Ranking |
|---|---|---|---|---|
| 1. | 5 g MgCO$_3$ + 3.5 g ammonium molybdate | 2.65 | 2 | 2 |
| 2. | 6 g ZnCO$_3$ + 4 g MgCo$_3$ | 2.6 | >16 | 4 |
| 3. | 5 g MgCO$_3$ + 4 g H$_3$BO$_3$ | 3.4 | >16 | 4 |
| 4. | 20 g zinc borate | 2.9 | 6 | 3 |
| 5. | 20 g zinc phosphate | 3.05 | 6 | 3 |
| 6. | 5 g ZnCO$_3$ + 2 g H$_3$BO$_3$ | 2.95 | >24 | 4 |
| 7. | Stetson '488 | 2.3 | 0.5 | 1 |

Rankings
0–1 hour = 1
1.25–4 hours = 2
4.25–8 hours = 3
8+ hours = 4

EXAMPLE 2

A bonding composition "A" was prepared according to the following formula:

800 gm Deionized water
388 gm Phosphoric acid, 85%
17.5 gm Zinc oxide
10.3 gm Ferric phosphate
120 gm Magnesium carbonate
31 gm Boric acid An aluminum coating composition was obtained by admixing the following:

200 ml Bonding composition "A"
50 ml Deionized water
8 gm Zinc aluminum phosphate (Heucophos ZPA)
120 gm Aluminum powder, air atomized, 4.5 $\mu$m average particle size The composition was blended for five minutes and then screened through a 325 mesh sieve. This coating was applied to AISI 410 steel panels in two coats, each cured at 650° F. The coated panels were tested as described in Table II and compared to panels coated with Example 7 of Allen '251 and shown to have equivalent performance. Example 7 of Allen '251 meets the requirements of MIL-C-81751B Type 1, Class 4. This formulation showed no sign of reactivity of the bonding solution with the pigment for over 24 hours. The bonding composition "A" contains no dissolved aluminum ion.

EXAMPLE 3

A different bonding composition, "B", was prepared by mixing the following ingredients in the order given:

759 gm Deionized water
398 gm Phosphoric acid, 85%
50 gm Magnesium oxide
51.6 gm Magnesium carbonate
25 gm Aluminum hydroxide, dried gel The pH of the resulting solution was 2.9.

In order to show that this composition was not "equilibrated" with respect to aluminum ion and ion source, the batch was split in half and an additional 5 gm of aluminum hydroxide was added (a 40% increase in aluminum hydroxide). The additional aluminum hydroxide dissolved readily giving a solution with a pH of 3.2. Even though bonding solution "B" was not equilibrated with respect to aluminum a stability of 3 hours was obtained when 40 gm of aluminum powder was added to 50 ml of bonding solution.

EXAMPLE 4

A bonding solution "C" was prepared according to the following formula:

830 ml Deionized water
287 gm Phosphoric acid, 85%
100 gm Magnesium carbonate
16 gm Aluminum hydroxide, dried gel
8 gm Ferric phosphate
31 gm Boric acid This composition had a pH of 2.75. It was not "equilibrated" with respect to any of the dissolved ions. A coating composition was mixed according to the following:

100 ml Bonding composition "C"
1 ml Mazon RI 325 Surfactant/corrosion inhibitor
0.1 ml Surfynol 104 surfactant
4.5 gm Flake aluminum powder, Reynolds 4-301
4 gm Zinc phosphate, Heucophos ZPA 66.5 gm Aluminum powder, air atomized, 4.5 μm average particle size After mixing, the coating showed no sign of binder pigment interaction for over 8 hours. The coating was spray applied to 410 stainless steel panels cured at 650 F. The panels were scribed with an "X" and placed in 5% salt spray per ASTM B117 for 500 hours. After testing there was no sign of corrosion of the substrate, either on the surface or in the scribe. This composition represents the use of flake and particulate aluminum in the same composition.

EXAMPLE 5

The 100 ml of bonding composition "B", three grams of boric acid was added. The resulting solution had a pH of 3.0. When 25 ml of deionized water, 4 gm of zinc aluminum phosphate, and 60 gm of aluminum metal powder were added to the solution, a composition which was stable for over 8 hours was obtained. 410 stainless steel panels coated with two coats of the composition were tested per the 500 hour salt spray test described in Table II. There was no evidence of attack of corrosion of the base metal.

EXAMPLE 6

The coating composition of Example 1 was prepared except that inert gas atomized spherical aluminum powder was used in place of air atomized aluminum. Coated panels were tested per the bend and corrosive oxidation tests described in Table II. There was no coating loss observed on the bend test specimens. Weight change on the corrosive oxidation test was less than 1 mg/cm$^2$. This example shows a useful formulation with spherical aluminum powder instead of air atomized aluminum.

EXAMPLE 7

A coating composition was prepared that contains no carcinogenic, poisonous, heavy metals containing, or otherwise toxic ingredients. The formula is given as follows:

Bonding Solution 830 gm Deionized water 244 gm Phosphoric Acid 16 gm Aluminum hydroxide, dried gel 8 gm Ferric phosphate 6 gm Zinc carbonate 100 gm Magnesium carbonate 31 gm Boric acid Coating Composition 100 ml Bonding solution 1 ml Mazon RI325 amine borate corrosion inhibitor 2 Dr Surfynol 104 surfactant 2.5 gm Aluminum flake, Reynolds 4-301

2 gm Zinc phosphate corrosion inhibiting pigment, Nalzin 2

66.5 gm Aluminum powder, Reynolds 1-201 (air atomized aluminum powder, average particle size 4.5 μm)

The coating was applied to representative 403 stainless steel panels in two separately cured coats (at 343° C. (650° F.)). 410 stainless steel panels were also coated with SermeTel W, an aluminum filled ceramic coating containing chromium made in accordance with Allen '251. Both coatings were burnished with alumina grit to achieve a sacrificial coating. Table II gives a list of tests performed and their results with the No Cr coating and Allen '251, Example 7.

TABLE II

PERFORMANCE DATA

| TEST DESCRIPTION | REQUIREMENT | Example Nos. 1–7, 9 | Allen '251 Exam. No. 7 |
|---|---|---|---|
| 1000 hrs. salt spray ASTM B117 | no galvanic attack of base metal[1] | Pass | Pass |
| 500 hrs. Salt Spray per ASTM B117 scribed "X" | no base metal attach (white corrosion products present) | Pass | Pass |
| Bend test, 90° around 14× mandrel | no separation from base metal | Pass | Pass |
| Abrasion resistance, Falling sand per ASTM D968 | >100 L/mil[1] | Pass | Pass |
| Oxidation resistance, 100 hrs at 1000° F. (538° C.) | <1 mg/cm$^2$ weight change | Pass | Pass |
| Corrosive oxidation. 24 hrs. salt spray then 100 hrs @ 1000° F. | no cracking, pitting, blistering <1 mg/cm$_2$ weight change | Pass | Pass |
| Thermal salt spray. 100 hrs @ 1000° F. then 1000 hrs salt spray | no cracking, pitting, blistering <5mg/cm$_2$ weight change | Pass | Pass |
| Hot Water Resistance. boiling water 10 min | no cracking, blistering, pass bend test | Pass | Pass |
| Fuel Resistance, 4 hrs immersion in ASTM Ref Fuel B | pass bend test after immersion | Pass | Pass |
| Hot Oil Resistance, 8 hrs immersion in di-2-ethylhexyl sebacate + ½% phenothiazine at 400° F. | no peeling, blistering, softening | Pass | Pass |
| Hydraulic Fluid Resistance, 24 hrs immersion in Skydrol at 300° F. | no blistering, wrinkling, softening | Pass | Pass |

[1]Test and requirements per MIL-C-81751 Type I Metallic-Ceramic Coating.

COMPARATIVE EXAMPLE 8

A comparative example, not in accordance with the present invention was prepared, using the composition set forth below, which is factored to compare with the base formula used in Example 1:

2300 g Deionized water 1018 g Phosphoric acid, 85%

354 g Magnesium carbonate 74 g Aluminum hydroxide

The stability test as described in Example 1 was carried out on this composition, and a time to reactivity of 0.5 hours was measured. This example falls within the preferred range of compositions of Stetson '488. It has low stability.

EXAMPLE 9

Coating Composition

A sample composition was prepared by making the following bonding solution and adding aluminum powder in the ratio given:

Bonding Solution 850 g Deionized water
287 g Phosphoric acid, 85%
100 g Magnesium carbonate
10 g Aluminum hydroxide
9 g Zinc carbonate
20 g Boric acid Coating Composition 150 mL Bonding solution
80 g Aluminum powder
4 g Zinc molybdate/phosphate
0.25 mL Surfactant (sorbitan monostearate)

Coated mild steel test panels were prepared and placed in salt spray. There were decreased amounts of sacrificial corrosion on the surface when compared with a similar formulation without the leachable corrosion inhibitor (zinc molybdate/phosphate).

In addition, another test was conducted using the same composition except that 4 g of a non-leafing flake aluminum was added. This composition showed improved corrosion resistance over the composition without the flake aluminum. The use of flake aluminum in combination with particulate aluminum is discussed in Mosser et al., U.S. Pat. No. 4,863,516, cited above.

The coating compositions of the invention can be applied to any ferrous metal alloy surfaces including cast iron, mild steel, low alloy steels, the 300 series stainless steels, nickel based alloys and titanium alloys. The coating compositions are designed particularly for turbine compressor air foils, such as blade, vanes, stators, and other parts. Such components are usually made of the alloys of the following: 410 Stainless Steel (AMS5504); 403 Stainless Steel; AM355 (15.5 Cr, 4.5 Ni, 2.9 Mo, 0.85 Mn, 0.12C 0.09n balance Fe); AM350 (16.5 Cr, 4.5 Ni, 2.9 Mo, 0.85 Mn, 0.10C 0.10N balance Fe); 430 Stainless (17.0% Cr); and 17–4 pH (16.1–16.5 Cr, 4.0–4.1 Ni, 0.28–0.3 Ta/Cb, 3.1–4.0 Cu, balance Fe).

The invention also covers the parts coated with the coating composition of the invention.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. An aqueous phosphoric acid bonding solution which comprises a source of magnesium, zinc and borate ions in aqueous phosphoric acid, the solution being at least substantially free of dissolved aluminum ions, chromate and molybdate and vanadium ions, and the solution having a pH in the range from about 2 to about 4.5.

2. The bonding solution of claim 1 wherein the source of magnesium ions is selected from the group consisting of magnesium carbonate, magnesium oxide, magnesium hydroxide and mixtures thereof.

3. The bonding solution of claim 1 wherein the source of zinc ions is selected from the group consisting of zinc oxide, zinc carbonate, zinc hydroxide, zinc phosphate, zinc borate, zinc molybdate/phosphate and mixtures thereof, and the source of borate ions is selected from the group consisting of boric acid, zinc borate and mixtures thereof.

4. The bonding solution of claim 1 which comprises zinc oxide, ferric phosphate, magnesium carbonate and boric acid.

5. A coating compensation comprising
   (a) an aqueous phosphoric acid bonding solution which comprises a source of magnesium, zinc and borate ions in aqueous phosphoric acid, the solution being at least substantially free of dissolved aluminum ions, chromate and molybdate and vanadium ions, and the solution having a pH in the range from about 2 to about 4.5, and (b) aluminum powder.

6. The coating composition of claim 5 wherein the source of magnesium ions is selected from the group consisting of magnesium carbonate, magnesium oxide, magnesium hydroxide and mixtures thereof.

7. The coating composition of claim 5 wherein the source of zinc ions is selected from the group consisting of zinc oxide, zinc carbonate, zinc hydroxide, zinc phosphate, zinc borate, zinc molybdate/phosphate and mixtures thereof, and the source of borate ions is selected from the group consisting of boric acid, zinc borate and mixtures thereof.

8. The coating composition of claim 5 which comprises zinc oxide, ferric phosphate, magnesium carbonate and boric acid.

9. The coating composition of claim 5 in which the aluminum powder is air atomized.

10. The coating composition of claim 9 in which the average particle size of the aluminum particles of the powder is 4.5 $\mu$m.

11. A metal coated with a cured coating composition comprising
   (a) an aqueous phosphoric acid bonding solution which comprises a source of magnesium, zinc and borate ions in aqueous phosphoric acid, the solution being at least substantially free of dissolved aluminum ions, chromate and molybdate and vanadium ions, and the solution having a pH in the range from about 2 to about 4.5, and (b) aluminum powder.

12. A metal part coated with the cured coating composition of claim 11 wherein the source of magnesium ions is selected from the group consisting of magnesium carbonate, magnesium oxide, magnesium hydroxide and mixtures thereof.

13. A metal part coated with the cured coating composition of claim 11 wherein the source of zinc ions is selected from the group consisting of zinc oxide, zinc carbonate, zinc hydroxide, zinc phosphate, zinc borate, zinc molybdate/phosphate and mixtures thereof, and the source of borate ions is selected from the group consisting of boric acid, zinc borate and mixtures thereof.

14. A metal part coated with the cured coating composition of claim 11 which comprises zinc oxide, ferric phosphate, magnesium carbonate and boric acid.

15. A metal part coated with the cured coating composition of claim 11 in which the aluminum powder is air atomized.

16. The metal part of claim 15 which is a stainless steel part.

* * * * *